(12) United States Patent
Pacher et al.

(10) Patent No.: US 11,780,299 B2
(45) Date of Patent: Oct. 10, 2023

(54) AIR VENT FOR A VEHICLE

(71) Applicant: ILLINOIS TOOL WORKS INC., Glenview, IL (US)

(72) Inventors: Thomas Pacher, Sembach (DE); Günther Krämer, Enkenbach-Alsenborn (DE); Michael Demerath, Hüffler (DE)

(73) Assignee: ILLINOIS TOOL WORKS INC., Glenview, IL (US)

( * ) Notice: Subject to any disclaimer, the term of this patent is extended or adjusted under 35 U.S.C. 154(b) by 310 days.

(21) Appl. No.: 17/267,596

(22) PCT Filed: Aug. 6, 2019

(86) PCT No.: PCT/US2019/045233
§ 371 (c)(1),
(2) Date: Feb. 10, 2021

(87) PCT Pub. No.: WO2020/036765
PCT Pub. Date: Feb. 20, 2020

(65) Prior Publication Data
US 2021/0316598 A1    Oct. 14, 2021

(30) Foreign Application Priority Data
Aug. 13, 2018 (DE) .................... 10 2018 119 639.3

(51) Int. Cl.
*B60H 1/34* (2006.01)
*F24F 13/14* (2006.01)

(52) U.S. Cl.
CPC ... *B60H 1/3421* (2013.01); *B60H 2001/3471* (2013.01)

(58) Field of Classification Search
CPC ........... B60H 1/3421; B60H 2001/3471; F24F 2013/1473; F24F 13/1426; F24F 13/15
See application file for complete search history.

(56) References Cited

U.S. PATENT DOCUMENTS 5,586,935 A    12/1996  Kotoh
7,455,581 B2 *  11/2008  Gehring ............... B60H 1/3428
                                                454/155
(Continued)

FOREIGN PATENT DOCUMENTS

DE    19935338 A1 *  2/2001  ........... B60H 1/3421
DE    10130951 A1     1/2003
(Continued)

OTHER PUBLICATIONS

PCT, International Search Report and Written Opinion, International Application No. PCT/US2019/045233; dated Oct. 31, 2019, 13 pages.

*Primary Examiner* — Steven S Anderson, II
(74) *Attorney, Agent, or Firm* — THOMPSON HINE LLP

(57) ABSTRACT

Air vent for a vehicle, including a housing with an inlet opening and an outlet opening, and an air duct for air flowing from the inlet opening to the outlet opening in a main flow direction. A slat assembly is arranged in the air duct and has a plurality of air-guiding slats that are pivotable together with respect to the main flow direction, and designed to divert the air flow from the main flow direction in an open position of the slat assembly and to interrupt the air flow in a closed position of the slat assembly. The air-guiding slats, in the closed position, are braced relative to one another and each of them takes up its end position, and at least some of the air-guiding slats reach their respective end position in succession during an adjustment of the slat assembly from the open position to the closed position.

9 Claims, 5 Drawing Sheets

(56) References Cited

U.S. PATENT DOCUMENTS

| | | | |
|---|---|---|---|
| 2014/0120826 A1* | 5/2014 | Takai | F24F 13/1426 |
| | | | 454/325 |
| 2015/0004897 A1 | 1/2015 | Ishikawa | |
| 2018/0099541 A1 | 4/2018 | Gareis | |
| 2019/0070935 A1 | 3/2019 | Ko | |

FOREIGN PATENT DOCUMENTS

| | | | | |
|---|---|---|---|---|
| DE | 102007036532 B4 | | 4/2011 | |
| DE | 102015118548 A1 | * | 12/2016 | ........... B60H 1/3421 |
| DE | 102015118548 A1 | | 12/2016 | |
| DE | 102016214186 A1 | | 2/2018 | |
| DE | 102017120208 B3 | | 6/2018 | |

* cited by examiner

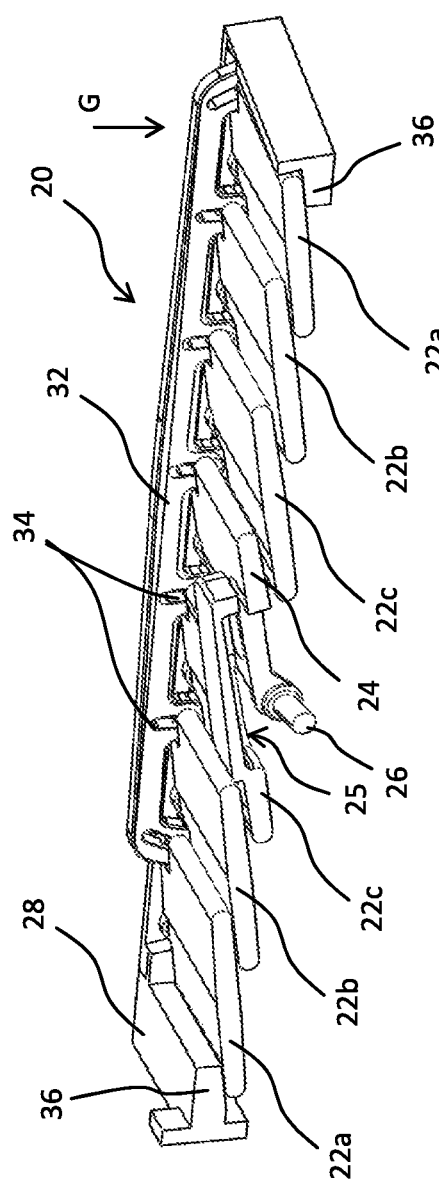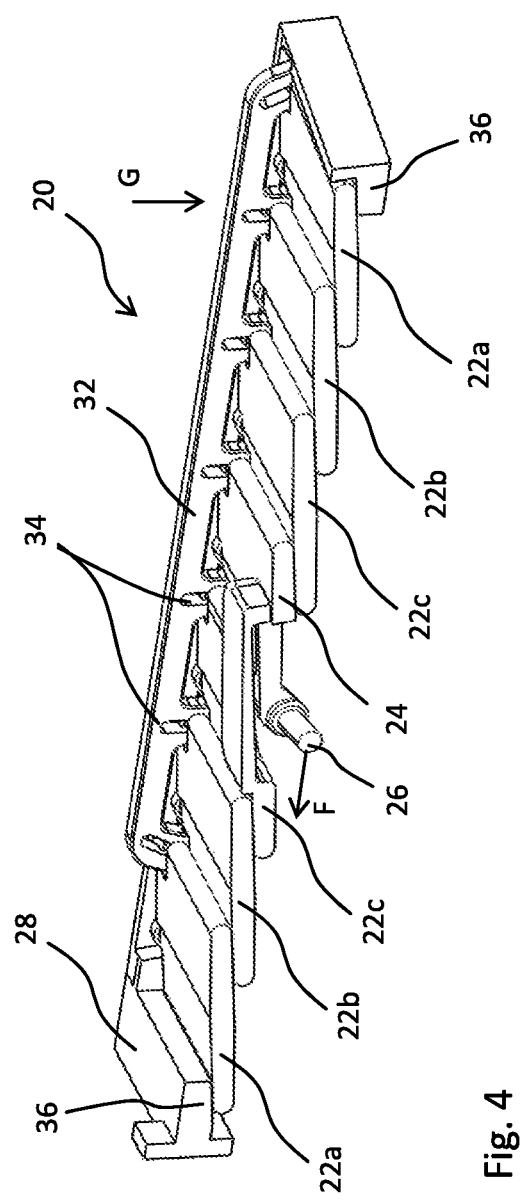
Fig. 3
Fig. 4

AIR VENT FOR A VEHICLE

TECHNICAL FIELD

The invention relates to an air vent for a vehicle, comprising a housing with an inlet opening and an outlet opening, the housing delimiting an air duct for air flowing from the inlet opening to the outlet opening in a main flow direction, further comprising a slat assembly arranged in the air duct and having a plurality of air-guiding slats that are coupled in terms of movement and are pivotable together with respect to the main flow direction, the air-guiding slats being designed to divert the air flow from the main flow direction in an open position of the slat assembly and to interrupt the air flow in a closed position of the slat assembly, the air-guiding slats, in the closed position of the slat assembly, being braced relative to one another by adopting in each case an end position.

BACKGROUND

Air vents of the above-mentioned type serve to feed air into a vehicle interior. The air fed via the air vent flows via the inlet opening into the air duct formed by the housing, through the latter and through the outlet opening into the interior of a vehicle. The vehicle can be for example a passenger car or a truck. Within the air duct, air-guiding slats are mounted in a pivotable manner and serve to divert the air flow from the main flow direction. By adjusting the air-guiding slats, the air flow can be diverted in a desired direction. The air-guiding slats are in this case coupled together in terms of movement—for example via a coupling rod—and in this way form the slat assembly. Furthermore, the air-guiding slats also serve to interrupt the air flow. The air-guiding slats can for this purpose be pivoted such that, in their respective end positions, they reduce the free flow area of the air duct to zero by bearing against one another and thus define a closed position. Such air-guiding slats thus also serve, as what are known as closing slats, to shut off the air-guiding duct and can in particular be provided as an alternative to a separately formed shutoff flap.

On account of manufacturing tolerances in particular in the case of the air-guiding slats, but also in the case of the coupling elements for coupling the air-guiding elements in terms of movement, and in the case of the housing and bearing frame, such slat assemblies frequently cannot fully interrupt the air flow, and in particular leakage flows can occur. These leakage flows can, in spite of the slat assembly being closed, lead to a disruptive escape of air for the passengers, it also being possible for flow noises such as whistling to occur. The abovementioned manufacturing tolerances can arise in particular when manufacturing by injection molding, for example plastic injection molding, with the result that the air-guiding slats, which ideally rest against one another in their end positions in the closed position, block one another and as a result do not provide sufficient sealing. In addition, in such slat assemblies, it is a drawback that a loud closing noise occurs when the closed position of the air-guiding slats is reached. This is unpleasant. Furthermore, in known closing slats, the problem arises that the closing force acting on the individual slats decreases with increasing distance from a control slat on account of an increasing lever length. An operating force acting on the control slat is thus not distributed uniformly to the further air-guiding slats coupled to the control slat. As a result, from a certain distance from the control slat, the air-guiding slats cannot necessarily be adjusted entirely into their respective end position, with the result that, here too, the abovementioned leakage flows can occur in the case of a (supposedly) closed slat assembly.

DE 10 2015 118 548 B4 describes an air vent, the air-guiding slats of which are pushed into the closed position via a resiliently configured gearwheel, which acts on one or more coupling rods that are adjustable via the gearwheel. As a result, the slats are pushed synchronously as a whole against the sealing surfaces in the housing by way of the energy stored in the spring element. This is intended to result in compensation for manufacturing tolerances. However, even in the case of such an air vent, the closing force decreases with increasing distance from an actuated slat. Therefore, very high operating forces are required in order to achieve reliable closing of the air-guiding slats. In addition, here too, when the air-guiding slats are adjusted into the closed position, an unpleasantly loud closing noise occurs.

Also known are air vents with air-guiding slats that can be moved into different angular positions with respect to one another in order to orient the air flow differently. For example, in this way, the air flow can be focused or fanned out or improved air diversion in extreme positions can be achieved. Such air vents are described for example in DE 10 130 951 A1, DE 10 2016 214 186 A1, DE 10 2007 036 532 B4 and U.S. Pat. No. 5,586,935 A.

SUMMARY

The invention is based on the object of providing an air vent that provides sufficiently high closing forces acting on the air-guiding slats with as low an operating force as possible and thus allows the air duct to be closed in a sealed manner, via its slat assembly, without causing unpleasant closing noises.

The invention achieves the object by an air vent as claimed in claim 1. Advantageous configurations are the subject matter of the dependent claims, of the description, and of the figures.

According to the invention, in an air vent of the type mentioned at the beginning, at least some of the air-guiding slats are configured such that they reach their respective end position in succession during an adjustment of the slat assembly from the open position to the closed position.

The air vent is configured to be used in a vehicle, for example in a passenger car or truck. The slat assembly arranged in the air duct can comprise a support frame, which is connectable to the housing of the air vent and within which the air-guiding slats can be mounted. It is also possible for the air-guiding slats to be mounted directly on the housing of the air vent. The air-guiding slats are pivotable into the air flow with respect to the main flow direction such that the air flow can be diverted from the main flow direction on an axis perpendicular to the main flow direction. By way of the air-guiding slats, the air flow can consequently obtain a direction component in one of two opposite directions. Depending on the manner of installation of the air vent in the vehicle, the air flow can be diverted for example to the sides or up or down by the air-guiding slats of the slat assembly. Downstream of the slat assembly or upstream of the slat assembly in the flow direction of the air flow, at least one further air-guiding element can be provided, which can divert the air flow in particular along an axis that is perpendicular to the main flow direction and perpendicular to the diverting axis of the air-guiding slats of the slat assembly. The slat assembly can comprise at least two air-guiding slats, for example at least three, at least five or at least seven air-guiding slats. The pivot axes of the air-guiding slats can be in particular perpendicular to the main flow direction. While the air-guiding slats can deflect the air flow in the described manner in the open position of the slat assembly, the air flow can be interrupted entirely by the air-guiding slats of the slat assembly in the closed position of the slat assembly. In the closed position of the slat assembly, each of the air-guiding slats takes up its end position. In this closed position, the air-guiding slats bear in particular against one another, and in particular adjacent air-guiding slats can overlap one another in a planar manner at least locally. The outer air-guiding slats of the slat assembly can in this case come into sealing contact with in each case one of two opposite housing walls of the housing.

For sufficient sealing of the air duct in the closed position of the slat assembly, the air-guiding slats are braced relative to one another in their respective end positions. The air-guiding slats that are thus braced relative to one another in the closed position of the slat assembly in this case press in particular against their respectively adjacent air-guiding slats. Consequently, each of the air-guiding slats can be braced with respect to its adjacent air-guiding slat(s). The air-guiding slats can be coupled together in terms of movement for example via at least one coupling rod. At least one of the air-guiding slats can be actuated as a control slat for moving all of the air-guiding slats of the slat assembly in a pivoting manner, the further air-guiding slats also being moved in a corresponding manner via the movement of this control slat on account of being coupled in terms of movement. It is also possible for the air-guiding slats to be braced relative to one another via an elastic coupling rod, as will be explained in more detail below. On account of the bracing of the air-guiding slats relative to one another, it is possible not only for any manufacturing tolerances of the air-guiding slats themselves but also of the entire kinematic chain from the operating element for actuating the air-guiding slats to any stops that may be provided on the housing to be compensated. In known air vents without elastic kinematic components, the closing force would have to be greatly increased in order to improve the sealing with existing manufacturing tolerances. Nevertheless, complete sealing of the air duct by the air-guiding slats is in this case generally not achieved. In addition, there is the risk of material failure. On account of the bracing of the air-guiding slats relative to one another—via elastic components of the kinematic chain, for example elastic coupling rods—tolerance compensation and, with incorporation of the elasticity of the components into the design of the kinematics, a sufficiently tight closure can be achieved. However, here too, high closing forces are necessary in order to move the slat assembly into the closed position and in particular to keep it in the closed position. In particular a coupling rod that is potentially provided has to be greatly tensioned for this purpose.

Therefore, according to the invention, the air-guiding slats do not all close at the same time. Rather, at least some of the air-guiding slats reach their respective end position in succession during the adjustment of the slat assembly from the open position into the closed position. In particular, adjacent air-guiding slats can reach their end positions in succession. For example, the outer air-guiding slats located at opposite ends of the slat assembly can reach their end positions first, in particular at the same time. The air-guiding slats that are located further in and are adjacent to the outer air-guiding slats can then reach their respective end position, in particular also at the same time. Subsequently, the adjacent air-guiding slats that are located further in can in turn reach their end positions, etc. Thus, the slat assembly can be closed symmetrically from outside to inside. The air-guiding slats can thus reach their respective end position in succession in a symmetric manner. Successive closing of the slat assembly is achieved. The inventors have found that, as a result of such successive closing with high sealing, lower closing forces need to be applied than in known air vents. In the air vent according to the invention, a control slat can be moved by a relatively low operating force, air-guiding slats coupled to the control slat then being adjusted securely into their respective end position via a uniform closing force. The air-guiding slats that are braced relative to one another can thus be adjusted more easily into their respective end position. The components that are involved in the bracing, in particular the elastic coupling rod, are in the process under a low, defined tension and therefore scarcely tend to deform under the influence of time and temperature. Nevertheless, sufficient bracing of the air-guiding slats and thus the desired tolerance compensation are achieved.

The inventors have also found that, in air vents with air-guiding slats that close the air duct, unpleasant closing noises arise in particular because the air-guiding slats all reach their end positions defining the closed position of the slat assembly at the same time. On account of the resultant simultaneous striking of all of the air-guiding slats against their respective neighbors, the abovementioned closing noise arises. The striking noises of the individual air-guiding slats add up here to a relatively loud snap. This is the case in DE 10 2015 118 548 B4, mentioned at the beginning, too. Since the kinematics therein are in the form of parallel kinematics, the slats all reach their end position at the same time during the adjustment of the slats into the closed position. This causes an unpleasantly loud closing noise. On account of the successive closing, according to the invention, of the air-guiding slats, these striking noises do not occur at the same time but in succession. Each individual striking noise is in this case so low that it barely intrudes. In particular, it is possible for all air-guiding slats of the slat assembly to reach their respective end position in succession. As a result, the closing noise can be reduced particularly greatly. However, it is also possible, as mentioned above, to provide symmetric closing. The air-guiding slats can thus reach their respective end position in succession, starting from outer air-guiding slats arranged at opposite ends of the slat assembly, during adjustment of the slat assembly from the open position into the closed position. The air vent according to the invention allows not only sealed closure of the air duct in the closed position of the slat assembly with application of relatively low closing forces, but also particularly quiet achievement of this closed position. The closing forces can for example be in the range from 1 N to 5 N.

According to one configuration, one of the air-guiding slats is configured as an actuable control slat, the control slat being movable into its end position in such a manner that the further air-guiding slats reach their respective end position in succession with a decreasing distance from the control slat, the control slat reaching its end position last. Consequently, the air-guiding slats of the slat assembly can be coupled in terms of movement such that the movement of an actuated control slat is transmitted to the air-guiding slats coupled to the control slat. For this purpose, it is possible for example for at least one coupling rod connected to the air-guiding slats to be provided, as mentioned above. The air-guiding slats located farthest from the control slat reach their end positions first, while the air-guiding slats located closer to the control elements subsequently reach their respective end position in succession. If, for example, a central air-guiding slat of the slat assembly is intended to serve as control slat, when the control slat is moved into its end position, first of all the external air-guiding slats are pivoted into their end positions, followed by the air-guiding slats that are adjacent to the respective external air-guiding slats, i.e. those that are located closer to the control slat, and subsequently the next neighbors, which are in turn located closer to the control slat, etc. Incremental closing of the air-guiding slats up to the control slat thus takes place. Therefore, it is possible for the symmetric closing, already mentioned above, of the slat assembly to take place from the outside to the inside. If, for example, one of the external air-guiding slats is intended to act as the control slat, according to this configuration, the outer air-guiding slat arranged at the opposite end of the slat assembly can reach its end position first, subsequently the air-guiding slat arranged next to this outer air-guiding slat, and subsequently all of the further air-guiding slats in succession with decreasing distance from the control slat. As a result, the air-guiding slats can be braced relative to one another particularly easily and reliably. Such successive closing can be achieved for example by the coupling rod, as explained in the following text.

According to one configuration, in the closed position of the slat assembly, the air-guiding slats are braced relative to one another by at least one elastically formed coupling rod. Such a coupling rod additionally serves to synchronize the movement of the air-guiding slats with one another. In particular, it is possible in this way to transmit the movement of an actuated control slat to a corresponding movement of the further air-guiding slats that are coupled to the control slat in terms of movement via the coupling rod, as explained above. In known air vents, such coupling rods are generally embodied in a rigid manner. Such rigid coupling rods are not suitable for bracing the air-guiding slats relative to one another. By way of an elastic configuration of the coupling rod, the bracing can be realized and thus any manufacturing tolerances of the air-guiding slats and thus also of the entire kinematic chain from an operating element for actuating the air-guiding slats to any stops that may be provided on the housing can be compensated, as mentioned above. The desired tightness and closing force are thus achieved according to this configuration by the elasticity of the coupling rod, resulting in the bracing of the air-guiding slats relative to one another in cooperation with the successive closing of the air-guiding slats.

The inventors have also found that the closing force of the air-guiding slats coupled by means of a conventional, rigid coupling rod decreases with distance from the force application point. When the air-guiding slats are coupled via such a coupling rod, the air-guiding slats thus experience a lower closing force with increasing distance from the control slat. Thus, it is possible for the control slat and air-guiding slats immediately next to the control slat to close sufficiently tightly by bearing against each other, but air-guiding slats located farther away allow leakage flows. This problem is also solved by the elastically configured coupling rod according to this configuration. The coupling rod can be embodied in particular as a resilient element. The coupling rod can consist for example of plastic and have a spring element that consists in particular of metal. In particular, such a spring element can be encapsulated with plastic during the production of the coupling rod and thus form the coupling rod. Such reinforcement of the coupling rod with an in particular metal spring element ensures that the coupling rod maintains sufficient elasticity over a wide temperature range and for a long time. In particular, the functionality of the coupling rod that is intended according to this configuration can thus be ensured over the climatic range demanded for air vents. The metal spring element also prevents the spring action being lost by creeping processes in plastic parts over time. As a result of the elastically configured coupling rod, the operating force exerted on the control slat can be distributed uniformly over the further air-guiding slats as far as the air-guiding slats located farthest from the control slat. Thus, the operating force exerted on the control slat is transmitted to the adjacent slats in a more favorable manner. The elastic coupling rod is deformed in the process. Thus, in spite of or precisely because of the different closing times of the individual air-guiding slats, a uniform contact pressure of the air-guiding slats against one another, i.e. a uniform closing force, can be achieved and thus ultimately a sufficiently tight closure of the air duct. In particular, it is possible to dispense with seals, for example made of a softer plastic than the air-guiding slats, and, in the simplest case, the air-guiding slats can be produced by one-component injection molding of plastic. Nevertheless, such seals can of course be provided. The successive achievement, according to the invention, of the end positions of the air-guiding slats during the adjustment of the slat assembly from the open position into the closed position, i.e. the successive closing of the air-guiding slats, can be achieved in different ways when such an elastic coupling rod is used, as explained in the following text.

According to one configuration in this regard, at least one end stop extending from a housing inner wall of the housing into the air duct is provided in order to stop at least one outer air-guiding slat of the slat assembly in its end position. In particular, in each case one end stop can be provided on opposite housing inner walls in order to stop in each case one of the two external air-guiding elements arranged at opposite ends of the slat assembly. When the end position of the at least one external air-guiding slat is reached, this air-guiding slat consequently strikes the end stop. This external air-guiding slat is then preferably not in the form of a control slat. The end stop can be configured as part of the housing or separately therefrom. In particular, the at least one end stop can be part of a support frame of the slat assembly. The at least one end stop is in this case arranged such that the external air-guiding slat that comes into contact with the end stop reaches its end position first. Subsequently, the air-guiding slats that follow the external air-guiding slat can then reach their end position in succession. In cooperation with the elastically configured coupling rod, the successive closing of the air-guiding slats can consequently be achieved by such an end stop. According to a further configuration in this regard, an end stop extending from a housing inner wall of the housing or from the support frame into the air duct is provided for each of the air-guiding slats. As a result of a corresponding arrangement or configuration of these end stops, it is possible for the air-guiding slats to reach their end position in the desired order. The end stops can extend in particular from one housing inner wall to an opposite housing inner wall. The end stops can be configured as part of the slat assembly on the support frame. The end stops can thus be configured such that the air-guiding slats reach their respective end position in succession. The end stops can have stop surfaces that are arranged in the air duct in an offset manner in particular in the main flow direction. As a result, it is possible for some of the air-guiding slats to strike their respective end stop and thus reach their respective end position sooner than other air-guiding slats.

According to one configuration, the coupling rod has a rod portion and coupling arms projecting from the rod portion, the air-guiding slats being connected in a rotatably movable manner via a respective attachment point to a respective coupling arm. The successive closing, according to the invention, of the slat assembly can in this case also be achieved via the geometric configuration of the rod portion, or of the coupling arms, as explained in the following text.

Thus, according to one configuration, the rod portion can extend in a curved manner and the coupling arms can be of equal length. In this case, the rod portion has in particular a curvature pointing away from the air-guiding slats. In particular, the rod portion is curved such that the rod portion exhibits a varying distance from a straight line extending through the pivot points of the air-guiding slats. Preferably, the perpendicular distance of the rod portion from the straight line extending through the axes of rotation of the air-guiding slats can be greatest for the control slat, in particular for the attachment point of the coupling arm of the control slat. Because the coupling arms are configured to be of equal length, the air-guiding slats can thus be at different angular positions in relation to one another in the open state. When the slat assembly is moved from the open position into the closed position, the air-guiding slats then reach their respective end position first, the coupling arms thereof being located closest to the straight line extending through the axes of rotation of the air-guiding slats. Thus, the control slat reaches its end position last. In other words, on account of this configuration of the rod portion and of the coupling arms, the attachment points of the coupling arms to the respective air-guiding slat in the non-braced state of the air-guiding slats, i.e. with the coupling rod not elastically deformed, extend at least locally to respectively different positions on in each case one pitch circle. Depending on the position of the attachment points on their respective pitch circles, the corresponding air-guiding slats thus reach their respective end position in succession.

According to a further configuration, the rod portion extends in a straight manner and the coupling arms are of differing length. The rod portion in this case does not extend in a curved manner but along a straight line. The differing distance of the attachment points of the air-guiding slats to the coupling arms in the open position is in this case achieved by a differing length of the coupling arms. In this way, too, the differing distance, explained above, of the attachment points from the straight line extending through the axes of rotation of the air-guiding slats can be achieved, i.e. the different position of the attachment points on their respective pitch circles. In this way, it is also possible as a result for the successive closing, according to the invention, of the air-guiding slats of the slat assembly to be achieved.

According to an alternative configuration, the rod portion extends in a curved manner and the coupling arms are of differing length. Here too, it is possible, as explained above, for the rod portion to extend in a curved manner, wherein the curvature of the rod portion can in this case point in particular toward the slat assembly. The differing distance of the attachment points of the slats to the coupling arms is in this case achieved by a combination of the coupling arms of different length and of the rod portion extending in a curved manner. In particular, the control slat can in this case be connected to the shortest coupling arm of the coupling rod, while the further air-guiding slats are connected to increasingly long coupling arms of the coupling rod with increasing distance from the control slat.

According to another configuration, the coupling rod has a rod portion and coupling arms projecting from the rod portion, the air-guiding slats being connected in a rotatably movable manner via a respective attachment point to a respective coupling arm, the air-guiding slats each having an elastic slat portion that has the respective attachment point. The attachment of the air-guiding slats can thus take place as already explained above. However, according to this configuration, the coupling rod does not have to be configured in an elastic manner but can also be configured in a rigid manner. The elasticity of the system is achieved instead via the elastic slat portions. These can yield in particular to differently great extents during adjustment of the air-guiding slats and thus result in successive closing of the slats.

BRIEF DESCRIPTION OF THE DRAWINGS

Several configurations of the invention are explained in the following text with reference to schematic figures, in which:

FIGS. 3 and 4 show sectional views through the slat assembly from FIG. 2, FIGS. 5-9 show very schematic views of different slat assemblies that allow the air-guiding slats to be braced relative to one another.

Figure 1:
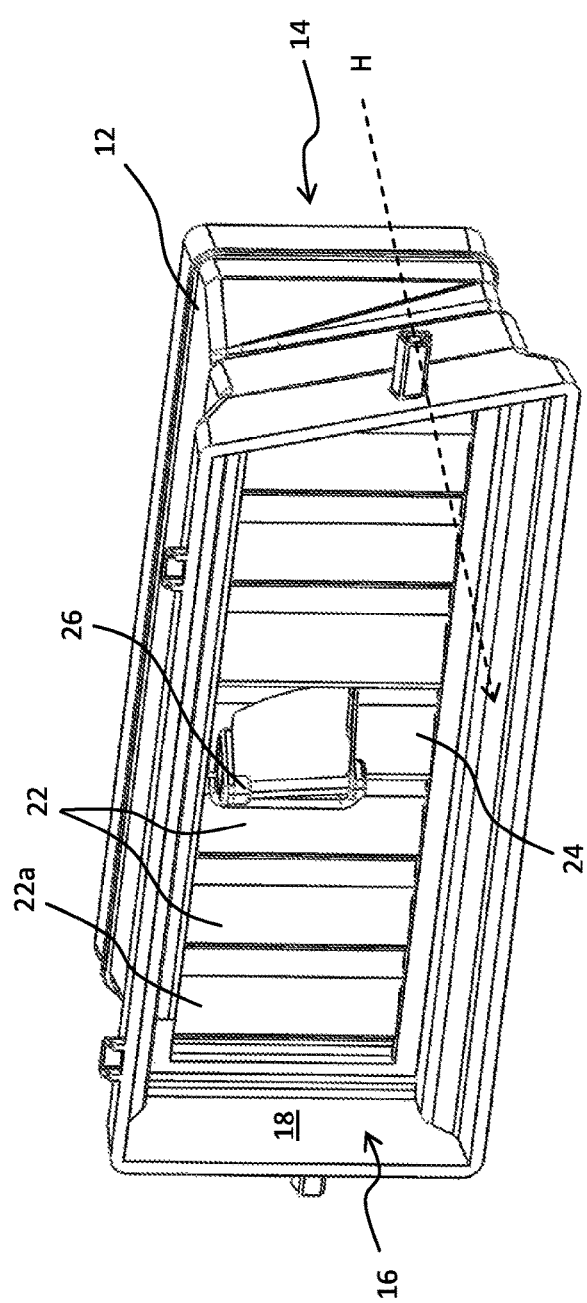
FIG. 1 shows a perspective view of an air vent according to the invention.
Figure 2:
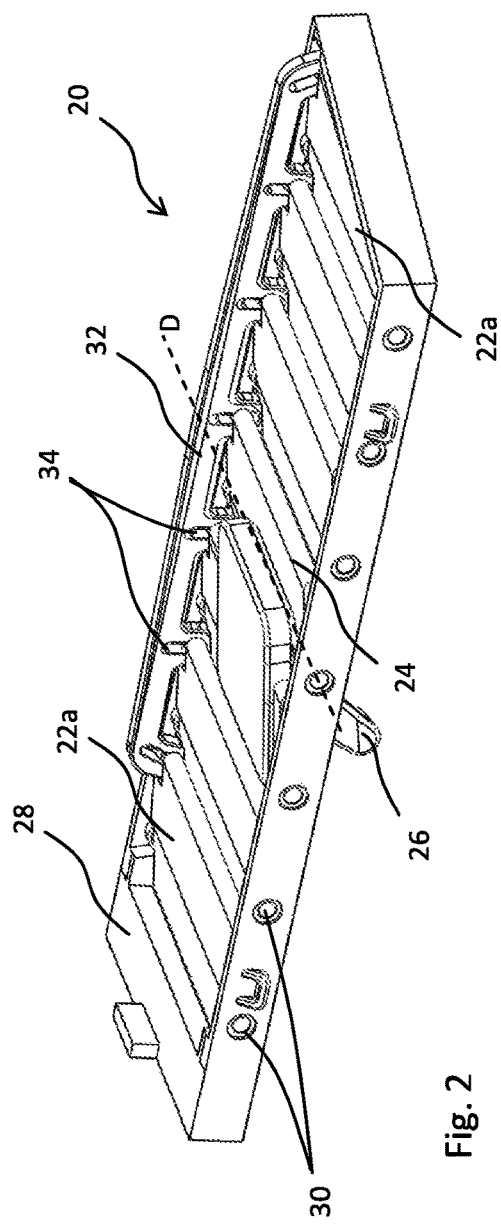
FIG. 2 shows the slat assembly of the air vent from FIG. 1 in a perspective view.

Unless specified to the contrary, identical reference signs denote identical objects in the following text.

DETAILED DESCRIPTION

FIGS. 1 to 4 show a first configuration of the invention. An air vent is visible, having a housing 12 with an inlet opening 14 and an outlet opening 16, the housing 12 delimiting an air duct 18 that extends from the inlet opening 14 to the outlet opening 16. Mounted within the air duct 18 is a slat assembly 20, which is visible in FIGS. 2 to 4. The slat assembly 20 has a plurality of air-guiding slats 22, which are coupled in terms of movement via a coupling rod 32 to coupling arms 34, with a control slat 24 arranged centrally in the slat assembly 20. The air-guiding slats 22 and the control slat 24 are in this case received in receptacles of the coupling arms 34 in each case via pins that are not visible, and are mounted in a pivotable manner on a support frame 28 of the slat assembly 20 via bearings 30. Via an actuating element 26 connected to the control slat 24, the control slat 24 can be pivoted about its axis of rotation D with respect to the air flow. On account of the coupling via the coupling rod 32, the air-guiding slats 22 are also pivoted about their corresponding axes of rotation that are parallel to the axis of rotation of the control slat.

As a result of the control slat 24 and thus the air-guiding slats 22 connected to the control slat 24 via the coupling rod 32 being pivoted about their axes of rotation, the air flow flowing through the air duct 18 can be diverted from the main flow direction H in two opposite directions. In the case of the arrangement of the air vent as in FIG. 1, the air flow can thus be diverted to the sides. Furthermore, the slat assembly 20 also serves to restrict or fully interrupt the air flow by adjusting the air-guiding elements 22, 24. For this purpose, the slat assembly can be moved from an open position into a closed position that is visible in FIG. 4. In the illustration in FIG. 3, the air-guiding slats have not yet all reached their respective end position. Consequently, the position of the air-guiding slats that is shown therein can also be understood to be an open position of the slat assembly. As is apparent therefrom, in this case only the outer air-guiding slats 22a have thus far reached their respective end position by coming into abutment in each case against end stops 36 of the support frame 28 of the slat assembly 20. Located between the further air-guiding slats 22b, 22c and between the air-guiding slats 22c and the control slat 24 are also apertures for the air flow. If the control slat 24 is now moved in the direction labeled F in FIG. 4 by being subjected to a force via the actuating element 26, the coupling rod 32 is moved substantially perpendicularly thereto in the direction G and the air-guiding slats 22, 24 are thus braced relative to one another. This is possible since the coupling rod 32 is configured in an elastic manner. As is visible in FIG. 3, the coupling rod 32 is curved slightly counter to the direction labeled G in the relaxed state. In the closed position shown in FIG. 4, the coupling rod 32 is tensioned and thus extends in a straight manner, i.e. without the abovementioned curve. Thus, the slats 22, 24 are braced relative to one another. In the closed position of the slat assembly that is visible in FIG. 4, the air-guiding slats can be held in their respective end positions for example via a friction force or latching. The air-guiding slat 22c arranged to the left of the control slat 24 in FIGS. 3 and 4 has a recess 25 for receiving the actuating element 26 in the closed position.

As a result of the elastic configuration of the coupling rod 32, the bracing of the air-guiding slats relative to one another can be achieved and thus any manufacturing tolerances of the air-guiding slats and of the coupling rod and of the entire kinematic chain from the actuating element to the housing can be compensated. Thus, reliable closing of the slat assembly can be achieved without leakage flows. When the slat assembly is moved into the closed position, the outer air-guiding slats 22a reach their respective end position first on account of the end stops 36. On account of the elastic configuration of the coupling rod 32, it is also possible for the further air-guiding slats 22b, 22c, 24 to reach their respective end position. In a rigid configuration of the coupling rod, this would not be possible. Following the outer air-guiding slats 22a, when the control slat 24 is moved further into its end position, the air-guiding slats 22b arranged next to the outer air-guiding slats 22a reach their respective end position first of all. Subsequently, the air-guiding slats 22c that are located in turn further inward reach their end position and finally, as the last slat, the control slat 24 reaches its end position. Thus, the closed position of the slat assembly is then achieved, see FIG. 4. Since the air-guiding slats therefore reach their end positions in succession, smaller closing forces are necessary than in the case of air-guiding slats that reach their end positions at the same time. In particular, by way of an operating force F that is smaller compared with known air vents and acts on the actuating element 26, it is possible for the slat assembly to be closed tightly. For this purpose, the coupling rod has to be put under less tension than in known air vents. In addition, as a result of the successive closing, only minor closing noises arise, which are brought about in that adjacent air-guiding slats strike one another (or in that the outer air-guiding slats 22a strike the stops 36). On account of the successive closing, these closing noises do not add up to an unpleasantly loud, single closing noise, however. Therefore, reliable and at the same time quiet closing can be achieved.

Figure 5:
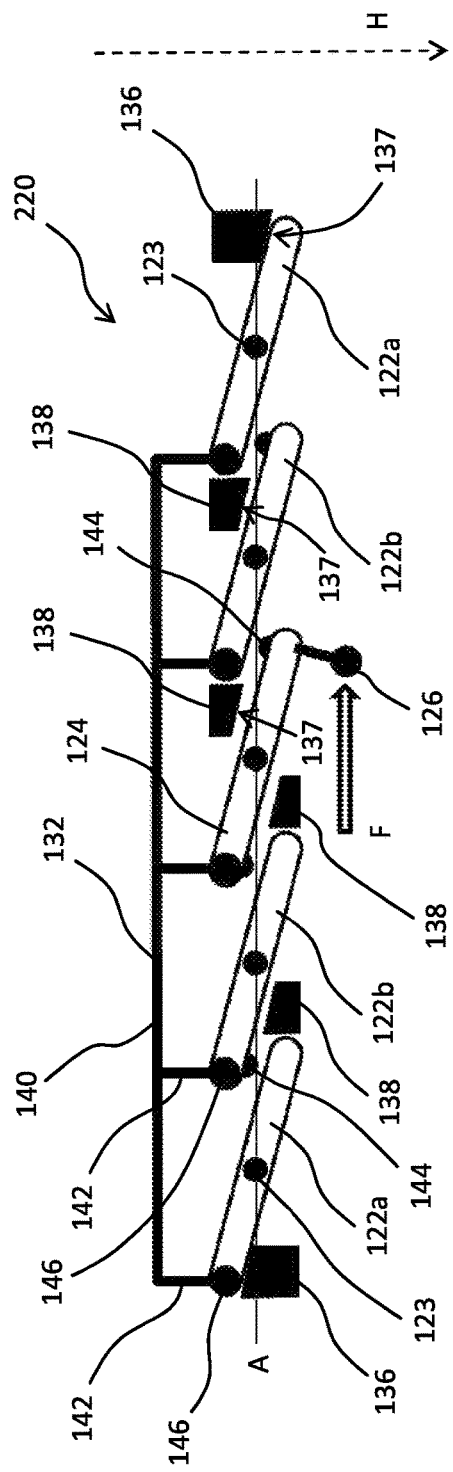

FIG. 5 schematically shows another configuration of the slat assembly of an air vent according to the invention. The slat assembly 220 comprises for example internal end stops 138 and outer end stops 136 formed on a support frame. In the slat assembly 220, air-guiding slats 122a, 122b, 124 that are arranged so as to be pivotable about axes of rotation 123 are mounted on the support frame, the air-guiding slat 124 being configured as a control slat that is actuable via an actuating element 126. Some of the air-guiding slats 122 have sealing elements 144. The air-guiding slats 122 are coupled together in terms of movement via a coupling rod 132, the coupling rod 132 having a rod portion 140 and five coupling arms 142 projecting perpendicularly from the rod portion 140. Via attachment points 146, the coupling arms 142 are each connected to one of the air-guiding slats 122 in a rotatably movable manner. The coupling rod 132 is also configured in an elastic manner. When a force is applied to the control slat 124 via its actuating element 126 along the arrow line labeled F, the air-guiding slats 122 can be moved from the open position shown in FIG. 5 into a closed position. In the process, the outer air-guiding slats 122a come into contact with their end stops 136 first of all, as already visible in FIG. 5. On account of the elastic coupling rod 132, it is also possible for the further air-guiding elements also to be adjusted into their end positions, the air-guiding slats 122b passing into contact with their end stops 138 first of all and thus reaching their end positions. Finally, as the last slat, the control slat 124 reaches its end position by striking its end stops 138. Thus, in this configuration, too, on account of the elastic configuration of the coupling rod and on account of the provision of the end stops 136, 138, the air-guiding slats can be adjusted successively into their end positions. The successive reaching of the end positions is in this case possible since the stop surfaces 137 of the end stops 136, 138 are arranged in an offset manner in the main flow direction H, as can be seen in FIG. 5. The stop surfaces are in this case arranged further downstream in the main flow direction H with increasing distance from the control slat 124. In the closed position, the sealing elements 144 bear against the adjacent air-guiding slats and thus ensure an additional seal.

Figure 6:
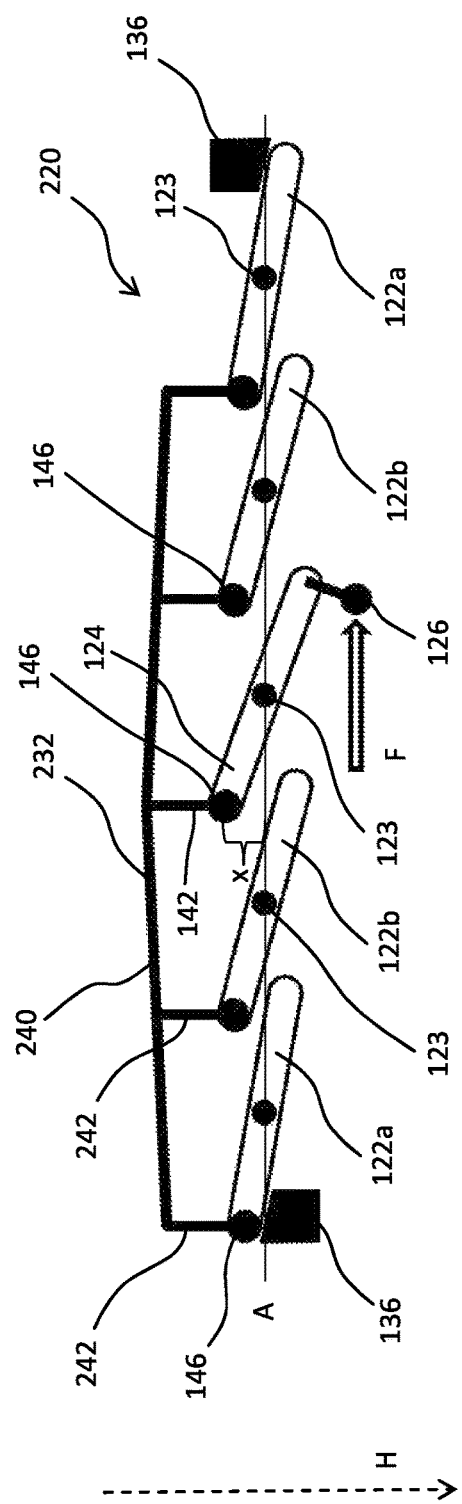

The configuration of the slat assembly 220 in FIG. 6 differs from the configuration of the slat assembly in FIG. 5 in that, instead of the internal end stops 138, a curved coupling rod 232 allows the successive closing of the air-guiding slats. In addition, in FIG. 6, the sealing elements 144 have been left out (although these could also be provided here, of course). The coupling rod 232 has a curve pointing counter to the main flow direction H, the curve being created by two rod parts of the rod portion 240 that are at a slight angle to one another. The coupling arms 242 are in this case, like the coupling arms of the configuration in FIG. 5, all the same length. It is clearly visible from FIG. 6 that, on account of the curved configuration of the rod portion 240 of the coupling rod 232, the attachment point 146 of the control slat 124 to its coupling arms 242 is at a greater distance X from an axis A extending through the axes of rotation 123 of the air-guiding slats. With increasing distance of the air-guiding slats 122 from the control slat 124, the distances of the attachment points 146 from the axis A decrease in this slat position. When the control slat 124 is moved from the position shown in FIG. 6 about its axis of rotation 123 when a force in the direction of the arrow labeled F is applied to the actuating element 126, the outer air-guiding slats 122a therefore reach their respective end position first of all, then the air-guiding slats 122b located further in, and finally the control slat 124. On account of this configuration of the coupling rod, the air-guiding slats 122, 124 are in the non-braced state, i.e. with a coupling rod that is not elastically deformed, in different positions on their respective pitch circle paths. Consequently, the successive closing can be realized as a result of this, too. In the closed position, the elastic coupling rod 232 is deformed such that the curved rod portion 240 extends in a substantially straight manner.

Figure 7:
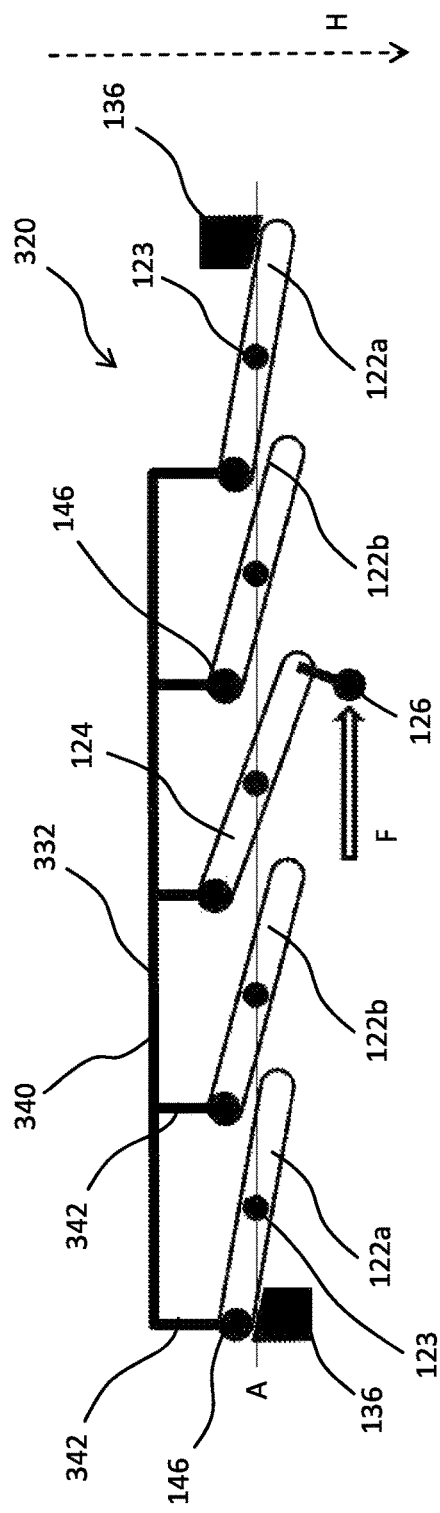

FIG. 7 shows a further configuration of a slat assembly 320, wherein, in contrast to the slat assembly in FIG. 6, the coupling rod 332 has a rod portion 340 that extends in a straight manner and coupling arms 342 of differing length projecting therefrom. The rod portion 340 is in particular perpendicular to the main flow direction H, just like the rod portion 132 in FIG. 5. In this way, too, a different distance of the attachment points 146 from the axis A and thus different positioning of the attachment points 146 on the respective pitch circle paths can be achieved, as explained above. Consequently, the successive closing is allowed as a result of this, too.

Figure 8:
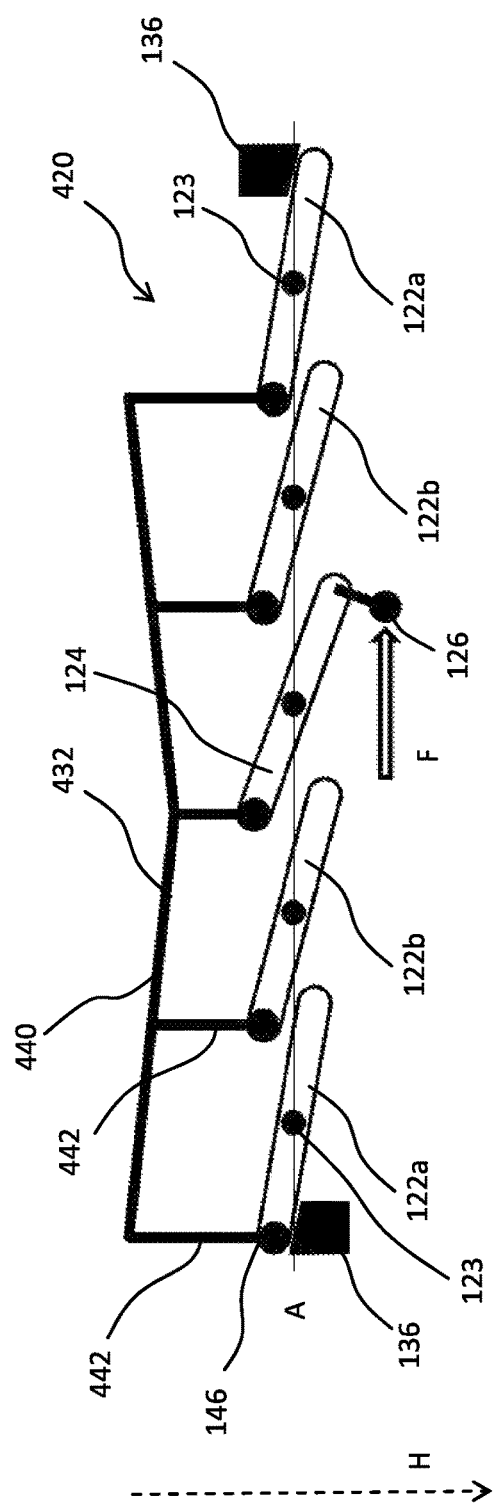

In the configuration in FIG. 8, the slat assembly 420 has a coupling rod 432, which has an inwardly curved rod portion 440 and coupling arms 442 of differing length projecting therefrom. The rod portion 440 is in this case curved in the main flow direction H, the length of the coupling arms increasing with increasing distance of the air-guiding slats 122 from the control slat 124. Again, on account of the elastic configuration of the coupling rod 432, successive closing can be achieved as a result of this, too.

Figure 9:
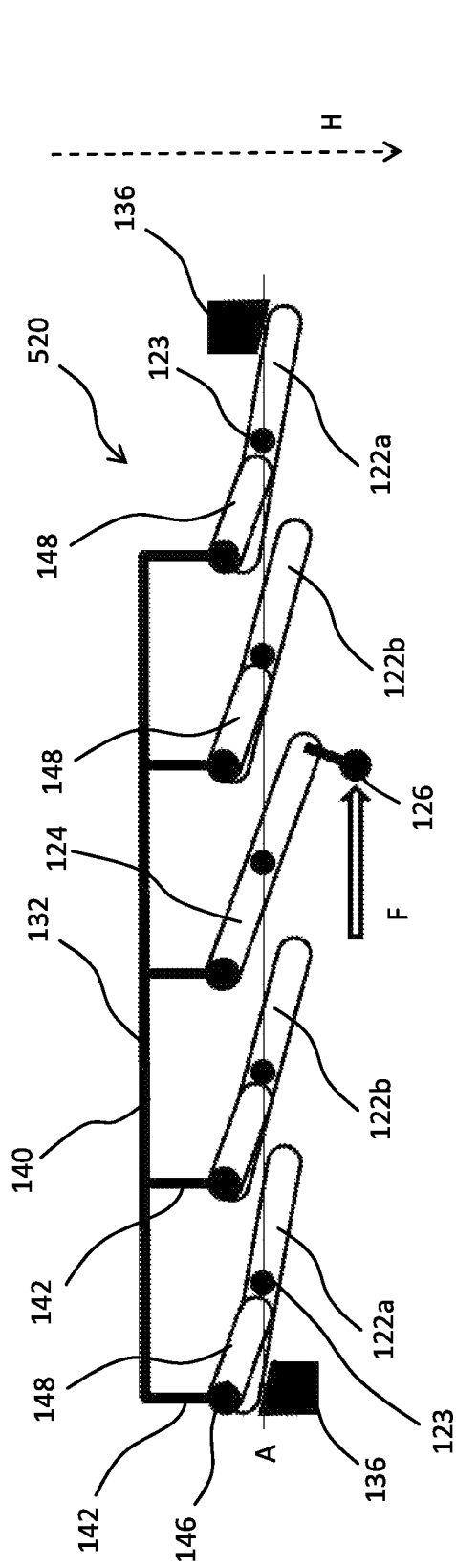

FIG. 9 shows a configuration of a slat assembly 520 that has a coupling rod 132 with a rod portion 140 that extends in a straight manner and coupling arms 142 of identical length, just like the configuration in FIG. 5. In this case, however, the coupling rod 132 does not have to be configured in an elastic manner. Rather, the successive closing is achieved via deformable slat portions 148 of the air-guiding slats 122. The slat portions 148 are each at an angle to a slat main body of the air-guiding slats 122, the angle between the slat portions 148 and the slat main bodies increasing with increasing distance from the control slat 124. The slat portions thus project to different distances counter to the main flow direction H in their rest position. When the control slat 124 is subjected to a force in the arrow direction F via its actuating element 126, the outer air-guiding slats 122a are first of all adjusted into their respective end position via the coupling rod 132, formed in particular in a rigid manner, in cooperation with the end stops 136. In this case, the slat portions 148 are elastically deformed, specifically such that the slat portions 148 pass into a plane with the slat main bodies. Following the outer air-guiding slats 122a, the air guiding slats 122b located further in are adjusted into their respective end position, wherein, here too, the slat portions 148 pass into a plane with their slat main bodies. Finally, the control slat 124 reaches its end position. Thus, the closed position of the slat assembly is achieved successively.

Figure 10:
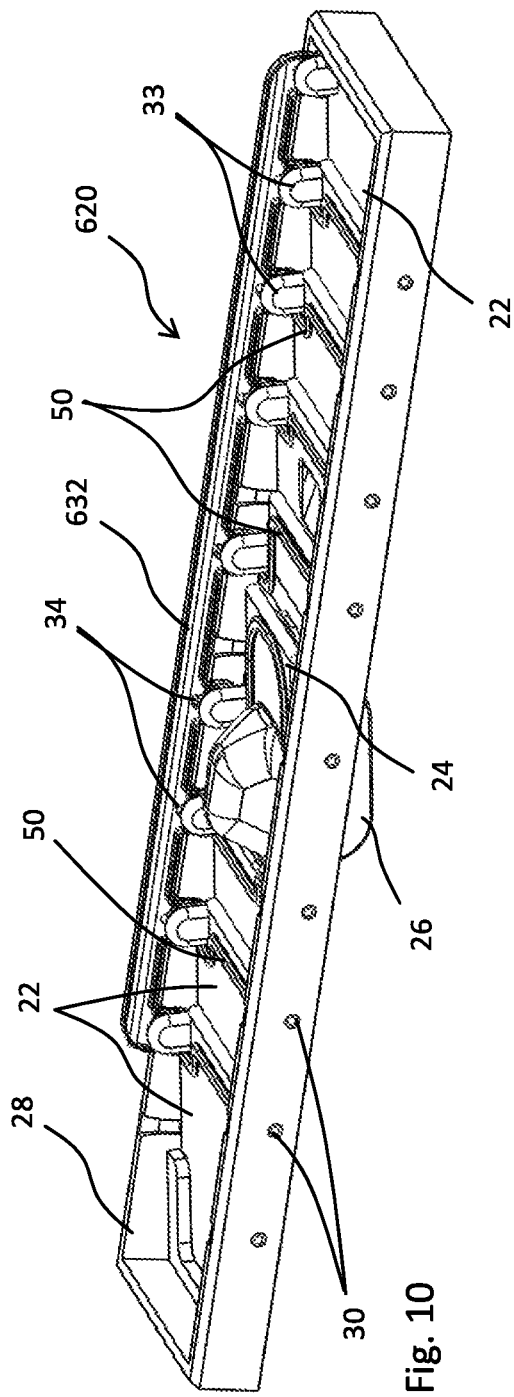
FIG. 10 shows a perspective view of a slat assembly according to a further configuration.

FIG. 10 shows a perspective view of a slat assembly 620 in a further configuration. The slat assembly 620 differs from the slat assembly illustrated in FIG. 2 mainly in that further air-guiding elements 22 are provided, in that the air-guiding elements 22 are sealed off from one another via sealing elements 50 in the illustrated closed position, and in particular in that the coupling rod 632 has a spring element let into the rod body. The spring element can consist in particular of metal and ensure sufficient elasticity of the coupling rod 632 over a wide temperature range. The metal spring also prevents the spring action being lost over time by creeping processes in plastic parts. Such creeping processes are very low anyway in the air vent according to the invention, however, since only minor tensions arise in the system on account of the successive closing, as explained above.

LIST OF REFERENCE SIGNS

12 Housing
14 Inlet opening
16 Outlet opening
18 Air duct
20 Slat assembly
22, 22a, b, c Air-guiding slats
24 Control slat
25 Recess
26 Actuating element
28 Support frame
30 Bearings
32 Coupling rod
34 Coupling arms
36 End stops
50 Sealing elements
122, 122a, b Air-guiding slats
123 Axes of rotation
124 Control slat
126 Actuating element
132 Coupling rod
136 Outer end stops
137 Stop surfaces
138 Inner end stops
140 Rod portion
142 Coupling arms
144 Sealing elements
146 Attachment point
148 Slat portions
220 Slat assembly
232 Coupling rod
240 Rod portion
242 Coupling arms
320 Slat assembly
332 Coupling rod
340 Rod portion
342 Coupling arms
420 Slat assembly
432 Coupling rod
440 Rod portion
442 Coupling arms
520 Slat assembly
620 Slat assembly
632 Coupling rod
A Axis
D Axis of rotation
F Direction of the operating force
H Main flow direction
X Distance

The invention claimed is:

1. An air vent for a vehicle, comprising a housing with an inlet opening and an outlet opening, the housing delimiting an air duct for air flowing from the inlet opening to the outlet opening in a main flow direction, further comprising a slat assembly arranged in the air duct and having a plurality of air-guiding slats that are coupled in terms of movement and are pivotable together with respect to the main flow direction, with each air-guiding slot pivotable between an open position in an open state of the slat assembly and an end position corresponding to a closed state of the slat assembly, the air-guiding slats designed to divert the air flow from the main flow direction in the open state of the slat assembly and to interrupt the air flow in the closed state of the slat assembly, the air-guiding slats, in the closed state of the slat assembly, being braced against one another, wherein the slat assembly is configured such that, during an adjustment of the slat assembly from the open state to the closed state, at least some of the air-guiding slats reach their respective end positions at different times in a successive manner;

wherein the air-guiding slats include an actuable control slat and further air-guiding slats that move in response to movement of the control slat, the slat assembly configured such that, during the adjustment of the slat assembly from the open state to the closed state, the further air-guiding slats progressively reach their respective end positions beginning with the further air-guiding slats farthest from the control slat and continuing with the further air-guiding slats that are successively closer to the control slat, with the control slat reaching its end position last.

2. The air vent as claimed in claim 1, wherein, in the closed state of the slat assembly, the air-guiding slats are braced relative against one another by at least one elastic coupling rod.

3. The air vent as claimed in claim 2, wherein at least one end stop extending from a housing inner wall of the housing into the air duct is provided in order to stop at least one further air-guiding slat of the slat assembly in its end position.

4. The air vent as claimed in claim 3, wherein an end stop extending from a housing inner wall of the housing into the air duct is provided for each of the air-guiding slats.

5. The air vent as claimed in claim 2, wherein the coupling rod has a rod portion and coupling arms projecting from the rod portion, each of the air-guiding slats being connected in a rotatably movable manner via a respective attachment point to a respective one of the coupling arms.

6. The air vent as claimed in claim 5, which has a rod portion having a curved profile, and coupling arms of equal length.

7. The air vent as claimed in claim 5, which has a rod portion having a straight profile, and coupling arms of differing length.

8. The air vent as claimed in claim 5, which has a rod portion having a curved profile, and coupling arms of differing length.

9. The air vent as claimed in claim 2, wherein the coupling rod has a rod portion and coupling arms projecting from the rod portion, each of the air-guiding slats being connected in a rotatably movable manner via a respective attachment point to a respective one of the coupling arms, each of the air-guiding slats having an elastic slat portion that has the respective attachment point.

\* \* \* \* \*